US012374480B2

(12) United States Patent
Elliott et al.

(10) Patent No.: US 12,374,480 B2
(45) Date of Patent: Jul. 29, 2025

(54) ACTUATION SYSTEM, AND METHOD

(71) Applicant: PACCAR Inc, Bellevue, WA (US)

(72) Inventors: Stephen Elliott, Denton, TX (US); Austin Walker, Denton, TX (US); Kevin Vardas, Denton, TX (US); Drew Bell, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 207 days.

(21) Appl. No.: 17/230,357

(22) Filed: Apr. 14, 2021

(65) Prior Publication Data

US 2021/0265092 A1 Aug. 26, 2021

Related U.S. Application Data

(63) Continuation of application No. 15/708,941, filed on Sep. 19, 2017, now Pat. No. 10,991,498.

(51) Int. Cl.

| | |
|---|---|
| ***H01F 7/06*** | (2006.01) |
| ***B05B 7/24*** | (2006.01) |
| ***H01F 7/08*** | (2006.01) |
| ***H01F 7/18*** | (2006.01) |
| *B05B 12/00* | (2018.01) |
| *F15B 15/14* | (2006.01) |

(52) U.S. Cl.

CPC .......... *H01F 7/064* (2013.01); *B05B 7/2491* (2013.01); *H01F 7/08* (2013.01); *H01F 7/18* (2013.01); *B05B 12/006* (2013.01); *F15B 15/14* (2013.01)

(58) Field of Classification Search

CPC ... H01F 7/06; H01F 7/064; H01F 7/18; H01F 7/2491; B05B 7/2491; B05B 12/006

USPC ...................... 361/160, 166, 168.1, 183, 191

See application file for complete search history.

(56) References Cited

U.S. PATENT DOCUMENTS

| | | | |
|---|---|---|---|
| 3,764,887 | A | 10/1973 | Bingley |
| 3,795,839 | A | 3/1974 | Walberg |
| 4,616,159 | A | 10/1986 | Ko et al. |
| 5,016,588 | A | 5/1991 | Pagdin |
| 5,589,723 | A | 12/1996 | Yoshida et al. |
| 5,675,609 | A | 10/1997 | Johnson |
| 5,899,958 | A | 5/1999 | Dowell et al. |
| 5,923,546 | A | 7/1999 | Shimada et al. |

(Continued)

FOREIGN PATENT DOCUMENTS

| | | |
|---|---|---|
| EP | 1927742 | 6/2008 |

OTHER PUBLICATIONS

Shu, D.W. et al. "The pulse width effect of single half-sine acceleration pulse on the peak response of an actuator arm of hard disk drive." Materials Science and Engineering, vol. A, No. 423, 2006, pp. 199-203.

(Continued)

*Primary Examiner* — Tuan T Dinh

(74) *Attorney, Agent, or Firm* — Merchant & Gould P.C.

(57) ABSTRACT

Sine pulse actuation systems and methods are disclosed herein. In one embodiment, a method for actuating an actuator includes: supplying a first input to the actuator, where the first input corresponds to a rising edge of a first sine function; supplying a second input to the actuator, where the second input corresponds to a generally constant amplitude plateau; and supplying a third input to the actuator, where the third input corresponds to a falling edge of a second sine function. The first, second and third inputs are control inputs or actuation inputs.

19 Claims, 12 Drawing Sheets

(56) References Cited

U.S. PATENT DOCUMENTS

| | | | | |
|---|---|---|---|---|
| 5,987,385 | A | 11/1999 | Varsamis et al. | |
| 6,201,993 | B1 | 3/2001 | Kruse et al. | |
| 6,710,554 | B2 | 3/2004 | Amith | |
| 6,731,569 | B2 | 5/2004 | Yurchenko et al. | |
| 6,942,469 | B2 | 9/2005 | Seale et al. | |
| 7,370,925 | B2 * | 5/2008 | Satake | B41J 2/04581 347/70 |
| 7,852,545 | B2 | 12/2010 | Miles | |
| 8,311,705 | B2 | 11/2012 | Wang | |
| 8,694,269 | B2 | 4/2014 | Mathews et al. | |
| 8,724,428 | B1 | 5/2014 | Sallas | |
| 8,773,114 | B2 | 7/2014 | Hayashi et al. | |
| 9,166,646 | B1 * | 10/2015 | Deloge | H04L 12/40 |
| 9,180,305 | B2 | 11/2015 | Roth et al. | |
| 9,294,261 | B2 | 3/2016 | Nitsche et al. | |
| 9,523,909 | B2 | 12/2016 | Naftali et al. | |
| 9,539,604 | B2 | 1/2017 | Wilkerson et al. | |
| 10,991,498 | B2 | 4/2021 | Elliott | |
| 2001/0036047 | A1 | 11/2001 | Macbeth | |
| 2004/0130081 | A1 | 7/2004 | Hein et al. | |
| 2005/0075803 | A1 | 4/2005 | Budmiger | |
| 2005/0193980 | A1 * | 9/2005 | Doering | F02P 5/1504 123/406.47 |
| 2006/0140286 | A1 * | 6/2006 | Goto | H04L 25/028 375/259 |
| 2006/0290662 | A1 * | 12/2006 | Houston | A63F 13/24 345/156 |
| 2008/0062145 | A1 | 3/2008 | Shahoian et al. | |
| 2009/0201620 | A1 * | 8/2009 | Gray | H02P 25/0925 361/159 |
| 2010/0278015 | A1 | 11/2010 | Huang | |
| 2012/0062244 | A1 | 3/2012 | Santana | |
| 2012/0099239 | A1 | 4/2012 | Sagues | |
| 2012/0188845 | A1 | 7/2012 | Jeffryes | |
| 2013/0322806 | A1 | 12/2013 | Hoffmann | |
| 2014/0218700 | A1 * | 8/2014 | Naftali | G02B 26/0841 353/121 |
| 2015/0224845 | A1 | 8/2015 | Anderson | |
| 2016/0063826 | A1 * | 3/2016 | Morrell | G08B 6/00 340/407.1 |
| 2016/0064639 | A1 * | 3/2016 | Park | H10N 30/802 310/317 |
| 2016/0244998 | A1 | 8/2016 | Kraus et al. | |
| 2016/0308482 | A1 | 10/2016 | Becker et al. | |
| 2017/0123519 | A1 | 5/2017 | Reitan | |
| 2017/0227567 | A1 * | 8/2017 | Son | G06F 13/102 |

OTHER PUBLICATIONS

Shu, D.W. et al. "Shock analysis of a head actuator assembly subjected to half-sine acceleration pulses." International Journal of Impact Engineering, vol. 34, 2007, pp. 253-263.

M. Dominguez-Pumar, "Energy Efficiency of Pulsed Actuations on Linear Resonators", IEEE Transactions on Circuits and Systems I: Regular Papers, Uploaded Feb. 7, 2017, 3 pages.

"Function & Arbitrary Waveform Generator Guidebook", B&K Precision Corporation 2017, available at http://www.okprecision.com, 26 pages.

Gex, Dominique. "Ultrasonic NDE testing of a Gradient Enhanced Piezoelectric Actuator (GEPAC) undergoing low frequency bending excitation." Apr. 2004. Georgia Institute of Technology, Masters Thesis. https://smartech.gatech.edu/handle/1853/5269. 127 pages.

Goetz, Stefan, et al. "Analysis and Optimization of Pulse Dynamics for Magnetic Stimulation." PLoS One, vol. 8, No. 3, Mar. 1, 2013, pp. 1-12, PLoS doi:10.1371/journal.pone.0055771.

Younis, Mohammad I., et al. "Investigation of the response of microstructures under the combined effect of mechanical shock and electrostatic forces." J. Micromech. Microeng., vol. 16, No. 11, 2006, pp. 2463-2474, doi:10.1088/0960-1317/16/11/03.

Younis, Mohammad I., et al. "Characterization for the performance of capacitive switches activated by mechanical shock." J. Micromech. Microeng., vol. 17, No. 7, 2007, pp. 1360-1370, doi:10.1088/0960-1317/17/7/019.

* cited by examiner

ACTUATION SYSTEM, AND METHOD

CROSS-REFERENCE TO RELATED APPLICATIONS

This application is a continuation of U.S. patent application Ser. No. 15/708,941, now U.S. Pat. No. 10,991,498, filed on Sep. 19, 2017, the entire disclosure of which is incorporated by reference herein.

BACKGROUND

Most conventional actuators are powered with an on-off switch. For example, an electrical solenoid may be powered on by switching the electrical switch to the on position, and powered off by switching the electrical switch back to the off position. As another example, a piston of a hydraulic cylinder may be set to one position by supplying a high pressure to the cylinder, followed by retracting the piston by setting the pressure back to a lower, initial pressure.

In many instances, actuators are integrated into larger systems. For example, a spray paint system may be driven by a source of pressurized air. When the pressurized air is supplied to the system, the system generates a jet of spray paint, and when the pressurized air is turned off, the jet of spray paint is also turned off.

FIG. 1 is a graph of actuation inputs 10 and 20 in accordance with conventional technology. With many conventional actuators, the action of the actuator generally corresponds to a square wave actuation input 10. The actuation input (e.g., pressurizing of a pneumatic cylinder) starts at time t1. The actuation amplitude is rapidly brought to A1, and is maintained at A1 for a length of time. At time t2, the actuation amplitude is rapidly reduced to its initial state of zero. However, the relatively rapid rise and fall of the actuation input may also lead to undesirable effects. For example, the actuation amplitude typically cannot immediately stabilize after rapidly rising from zero (or from some other value smaller than A1) to A1. Instead, the actuation amplitude A1 undergoes amplitude ringing or amplitude settling 13 before stabilizing at A1. Analogously, rapidly reducing the actuation amplitude from A1 to zero at time t2 also causes amplitude ringing 13. Amplitude ringing is generally undesirable, because the ringing is a symptom of the noise and reduced efficiency of the system.

With some conventional actuators, the actuation and de-actuation may be less rapid. For example, with a trapezoidal actuation input 20, the actuation (e.g., energizing of an electrical solenoid) starts at time t3 and reaches actuation amplitude A2 at time t4. The actuator maintains the amplitude A2 through time t5, and then the actuation amplitude is reduced to zero or close to zero by time t6. With the trapezoidal actuation, amplitude ringing 23 may be reduced in comparison to the amplitude ringing 13, but generally the ringing is not eliminated. Additionally, the trapezoidal actuation requires longer time to reach the target amplitude A2.

Accordingly, there remains a need for the actuation systems and methods that reduce noise and energy losses of the actuators.

SUMMARY

This summary is provided to introduce a selection of concepts that are further described below in the Detailed Description. This summary is not intended to identify key features of the claimed subject matter, nor is it intended to be used as an aid in determining the scope of the claimed subject matter.

In one embodiment, a method for actuating an actuator includes: supplying a first input to the actuator (the first input corresponding to a rising edge of a first sine function); supplying a second input to the actuator (the second input corresponding to a generally constant amplitude plateau); and supplying a third input to the actuator (the third input corresponding to a falling edge of a second sine function. The first, second and third inputs can be a control input or an actuation input.

In one aspect, the first and second sine functions are the same.

In another aspect, the first and second sine functions have different frequencies and the same amplitude.

In one aspect, the method includes cyclically repeating the first, second, and third inputs.

In one aspect, the actuator may be a pneumatic actuator, a hydraulic actuator, or an electrical solenoid.

In one aspect, the inputs to the actuator are provided by energizing an electrical power bus.

In one aspect, the method also includes: determining a first set of digitized values corresponding to the rising edge of the first sine function; determining a second set of digitized values corresponding to the falling edge of the second sine function; and converting the first and second sets of digitized values to an analog function using an analog-to-digital (A/D) converter.

In another aspect the method also includes actuating an air gun with the actuator.

In one embodiment, a system includes a source of inputs; and an actuator configured to receive the inputs. The inputs include a rising edge of a first sine function, a generally constant amplitude plateau, and a falling edge of a second sine function. The inputs may be control inputs or actuation inputs.

In one aspect, a controller determines a first set of digitized values corresponding to the rising edge of the first sine function, and a second set of digitized values corresponding to the falling edge of the second sine function. The system also includes an analog-to-digital (A/D) converter.

In one aspect, the actuator may be a pneumatic actuator, a hydraulic actuator, or an electrical solenoid.

In another aspect, the actuator is an electrical solenoid having an armature. A natural frequency of the armature corresponds to a frequency of the first and second sine functions.

In one aspect, the source of inputs includes an electrical power bus.

In one aspect, the system also includes a manifold for receiving plant air at a generally constant pressure. The system also includes a transducer. The transducer receives an electrical signal representing the first sine function and the second sine function, and plant air from the manifold. The transducer can output plant air at a modulated pressure having the rising edge of the first sine function, the amplitude plateau, and the falling edge of the second sine function.

In one aspect, the actuator is an air gun for generating a spray of paint based on the modulated pressure from the transducer.

In another aspect, the actuator is an electric solenoid having an armature connected to a spring.

In one aspect, the natural frequency of the armature connected to the spring corresponds to the frequency of the actuation inputs.

In one aspect, the first and second sine functions have different frequencies and the same amplitude.

In one aspect, the actuator is a first actuator. The system also includes a second actuator working in concert with the first actuator. In one aspect, the first actuator and the second actuator are solenoids have their respective armatures. The armatures can oscillate along the same axis.

DESCRIPTION OF THE DRAWINGS

The foregoing aspects and many of the attendant advantages of inventive technology will become more readily appreciated as the same become better understood by reference to the following detailed description, when taken in conjunction with the accompanying drawings, wherein.

DETAILED DESCRIPTION

While illustrative embodiments have been described, it will be appreciated that various changes can be made therein without departing from the spirit and scope of the inventive technology. Briefly, the inventive technology is directed to the actuators that are driven or controlled by sinusoidal inputs (also referred to as "sine pulses," "sine pulse functions," or "sine functions"). For example, a pressure of air supplied to a pneumatic cylinder may have sinusoidal rising and falling edges, and a relatively flat amplitude between the edges.

In some embodiments, the input to the actuator includes a rising sinusoidal edge until the amplitude reaches its required value. For example, a sinusoidal rising electrical current may be provided to an electrical solenoid to drive the solenoid to its required amplitude. This sinusoidal rising edge may be followed by a generally constant electrical current to maintain the amplitude of the electrical solenoid. The actuator may be brought to its initial position, or to some other position, by a sinusoidal falling edge until the starting amplitude, or some other amplitude, is reached. In some embodiments, the rising and falling edges may operate at different frequencies even within the same cycle.

In some embodiments, the actuator can be integrated into a vehicle system, for example, the systems for fuel injection, hydraulic or pneumatic brakes, diesel exhaust fluid (DEF) dosing, powering of electrical buses and cables (e.g., electrical or optical transmission lines, wireless transmission lines, etc.), or powering of electronics of the vehicle. In some embodiments, the actuators can be used for manufacturing processes, for example, for air-painting of the vehicles. In many embodiments, the sinusoidal inputs to the actuators can eliminate or at least reduce energy loss and system noise that are typically associated with the ringing of the actuator's amplitude.

In at least some embodiments, the sinusoidal actuation and/or control reduces the noise in the system and improves energy efficiency of the system. In many practical situations, placement of the rising and falling edges of the sine pulses may be more precise than the placement of the rising and falling edges of the square pulses due to the deterministic nature of the sine pulses.

Figure 1:
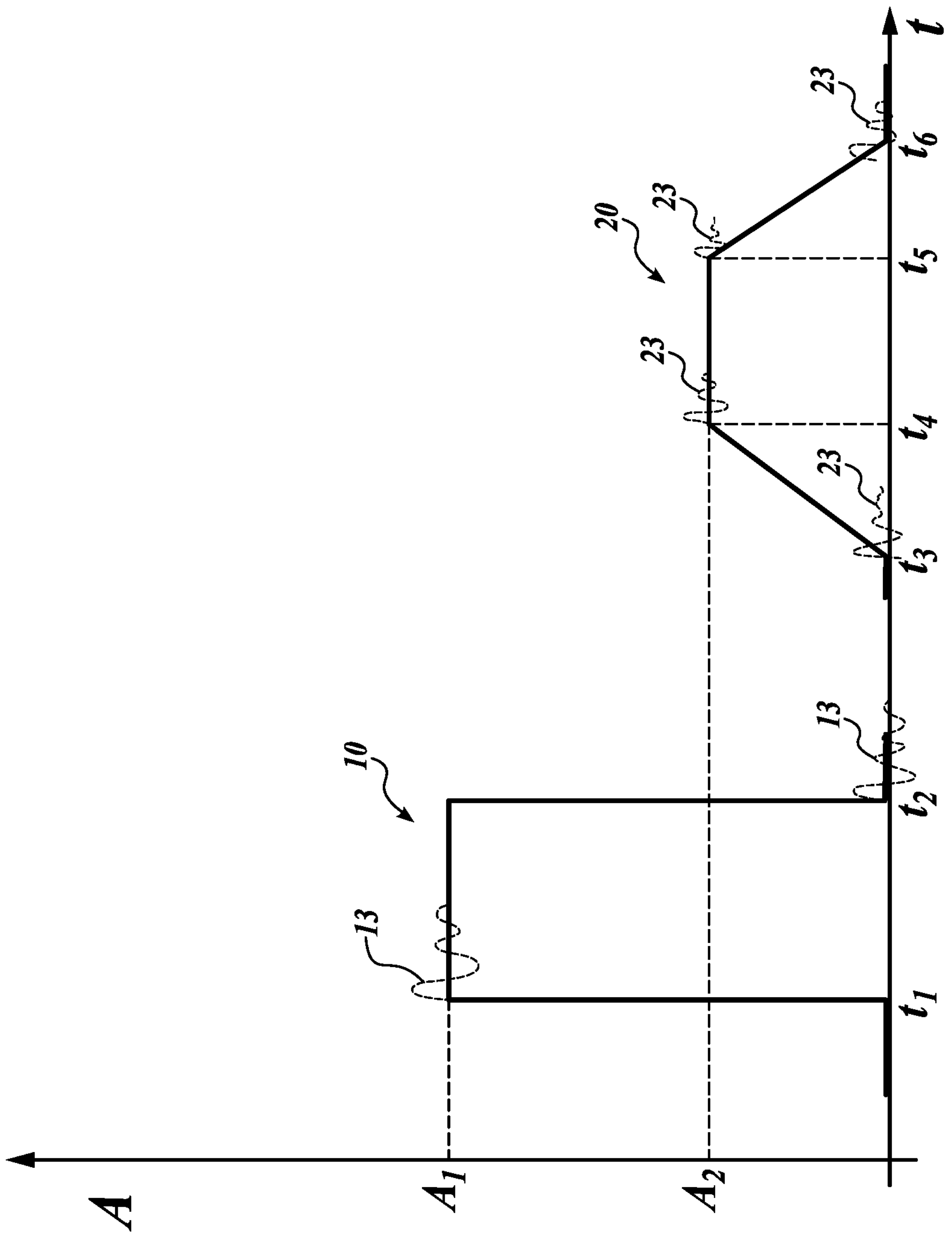
FIG. 1 (PRIOR ART)
FIG. 1 is a graph of actuation inputs in accordance with conventional technology.
Figure 2:
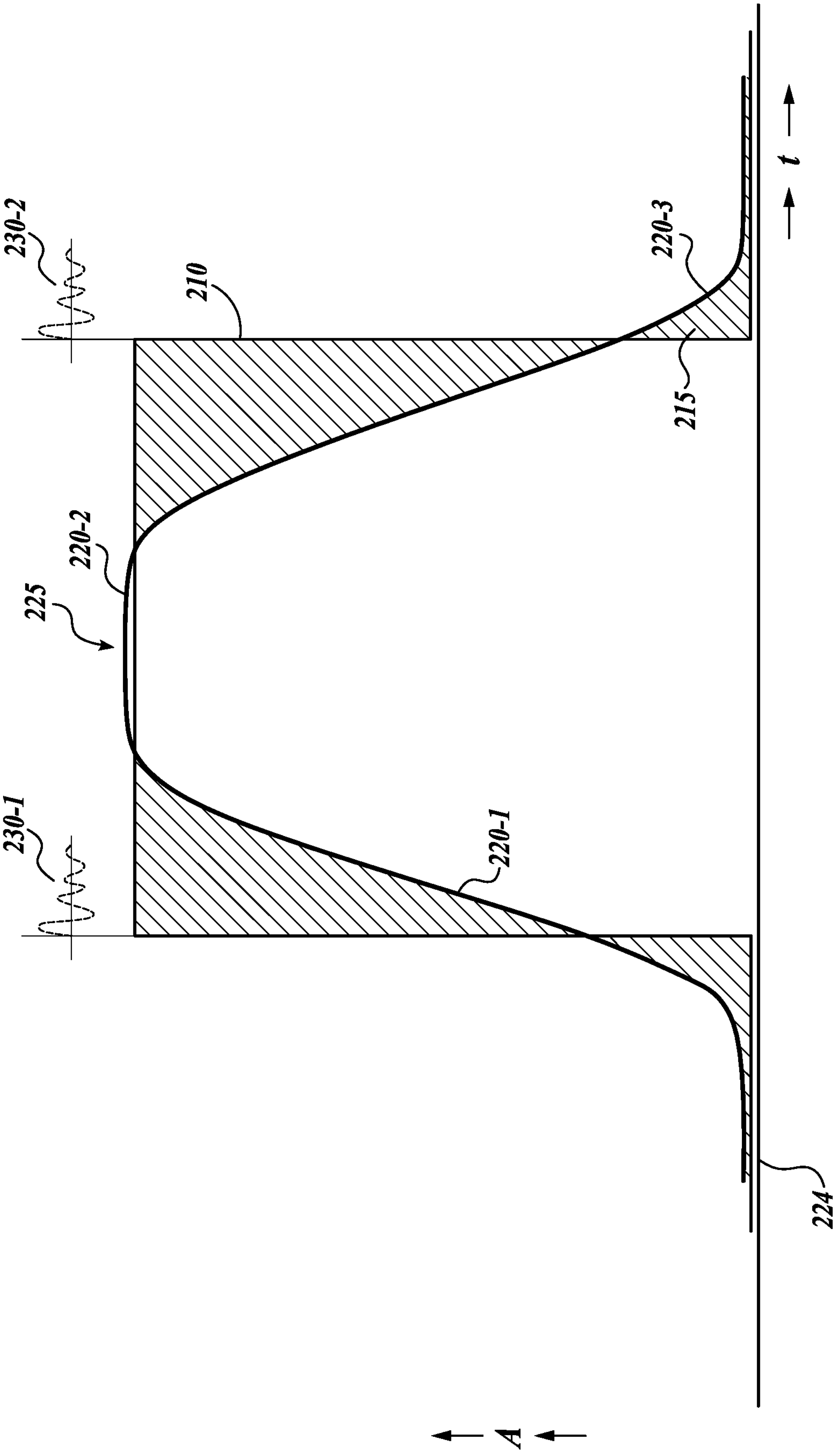
FIG. 2 is a graph of an actuation input in accordance with an embodiment of the present technology.

FIG. 2 is a graph of an actuation input in accordance with an embodiment of the present technology. The horizontal axis in the graph shows time in, for example, milliseconds, seconds, or other units. The vertical axis shows amplitude of the input to the actuator, for example, air pressure, electrical current, magnetic field, or other physical mediums. In operation, the output of the actuator, although a function of many variables, is typically proportional to the input of the actuator. For example, the force of the hydraulic actuator generally depends on the pressure of the working fluid, the force of the electrical solenoid depends on the magnitude of the electrical current flowing through the armature, the amount of spray paint delivered by the air gun depends on the air pressure in the system, etc.

A square wave actuation input 210 represents an input of the actuator according to the prior art (also referred to as "actuation of the actuator" or, without being bound by theory, "work of the actuator"). As explained above, the square wave actuation input is accompanied with ringing noise, for example, a ringing noise 230-1 associated with the rising edge of the square wave, and a ringing noise 230-2 associated with the falling edge of the square wave. The ringing noise increases the energy loss and noise in the system.

In some embodiments, a sinusoidal actuation input 225 represents an input of the actuator according to the present technology. In some embodiments, the sinusoidal actuation input 225 includes a sinusoidal rising edge 220-1, a relatively flat (i.e., constant or close to constant) steady amplitude 220-2 (also referred to as "maximum amplitude," "amplitude plateau," "high amplitude" or "saturation amplitude"), and a sinusoidal falling edge 220-3, followed by a return of the input to its initial value, or some other value that is typically lower than the steady amplitude 220-2. In some embodiments, at the end of the sinusoidal rising edge 220-1, a first derivative of the amplitude over time (dA/dt) can be zero to eliminate or at least minimize the discontinuities in the first derivative of the amplitude at the transition between the sinusoidal rising edge 220-1 and the steady amplitude 220-2. Analogously, a first derivative of the amplitude over time (dA/dt) at the beginning of the sinusoidal falling edge 220-3 can also be zero or close to zero. Similarly, close to the minimum or zero input to the actuator (e.g., within 2% or within 5% of zero amplitude), the beginning of the sinusoidal rising edge 220-1 and the end of the sinusoidal falling edge 220-3 may also have the first derivative of the amplitude over time (dA/dt) zero. In some embodiments, the absence of the discontinuities of the sinusoidal actuation input 225 may eliminate or at least reduce the energy losses and the noise that accompany the square actuation input 210. Without being bound by theory, it is believed that the energy losses of the square actuation input 210 in comparison to the sinusoidal actuation input 225 may at least in part correspond to a hatched portion 215 of the graph.

Figure 3:
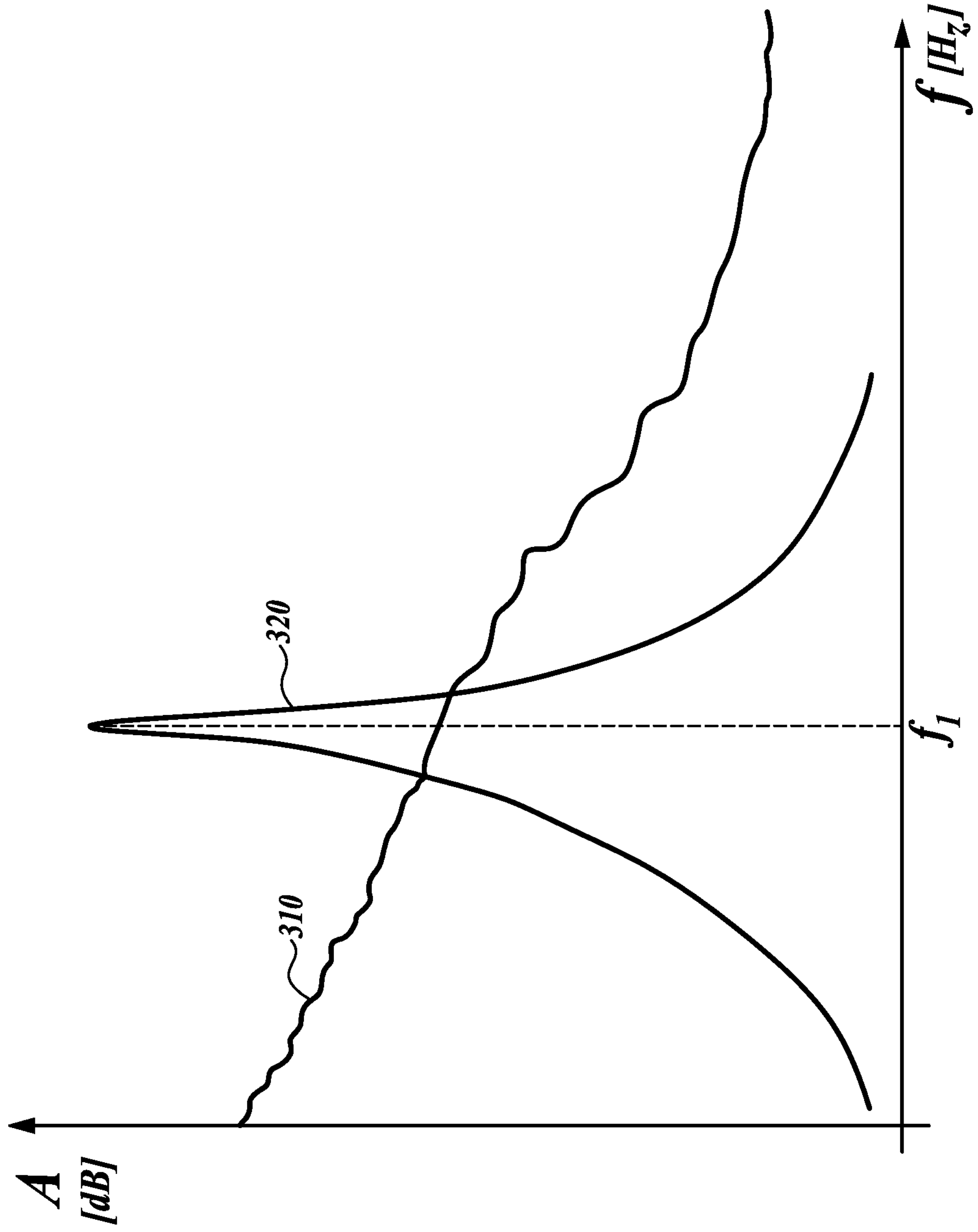
FIG. 3 is a spectral graph of the actuation input in accordance with an embodiment of the present technology.

FIG. 3 is a spectral graph of the actuation input in accordance with an embodiment of the present technology. The horizontal axis of the spectral graph shows frequency in Hz. The vertical axis of the graph shows spectral density in dB. Curve 310 shows the spectral density of a square wave actuation input according the prior art. In general, the square wave actuation input includes many frequencies (theoretically, an infinite number of frequencies) as seen by a relatively broad spectral density 310.

Curve 320 shows a spectral density of the sinusoidal actuation input 225 that represents an input of the actuator in accordance with an embodiment of the present technology. The spectral density of the sinusoidal actuation input 225 includes a relatively well defined frequency peak, indicating a narrow range of frequencies (theoretically, just one frequency) in the spectrum. Generally, frequency f1 corresponds to the frequency of the sinusoidal edges of the actuator input. In some embodiments, for example when the rising and falling edges of the actuator input operate at different frequencies, the spectral density 320 may include two peaks at two different frequencies.

Figure 4A:
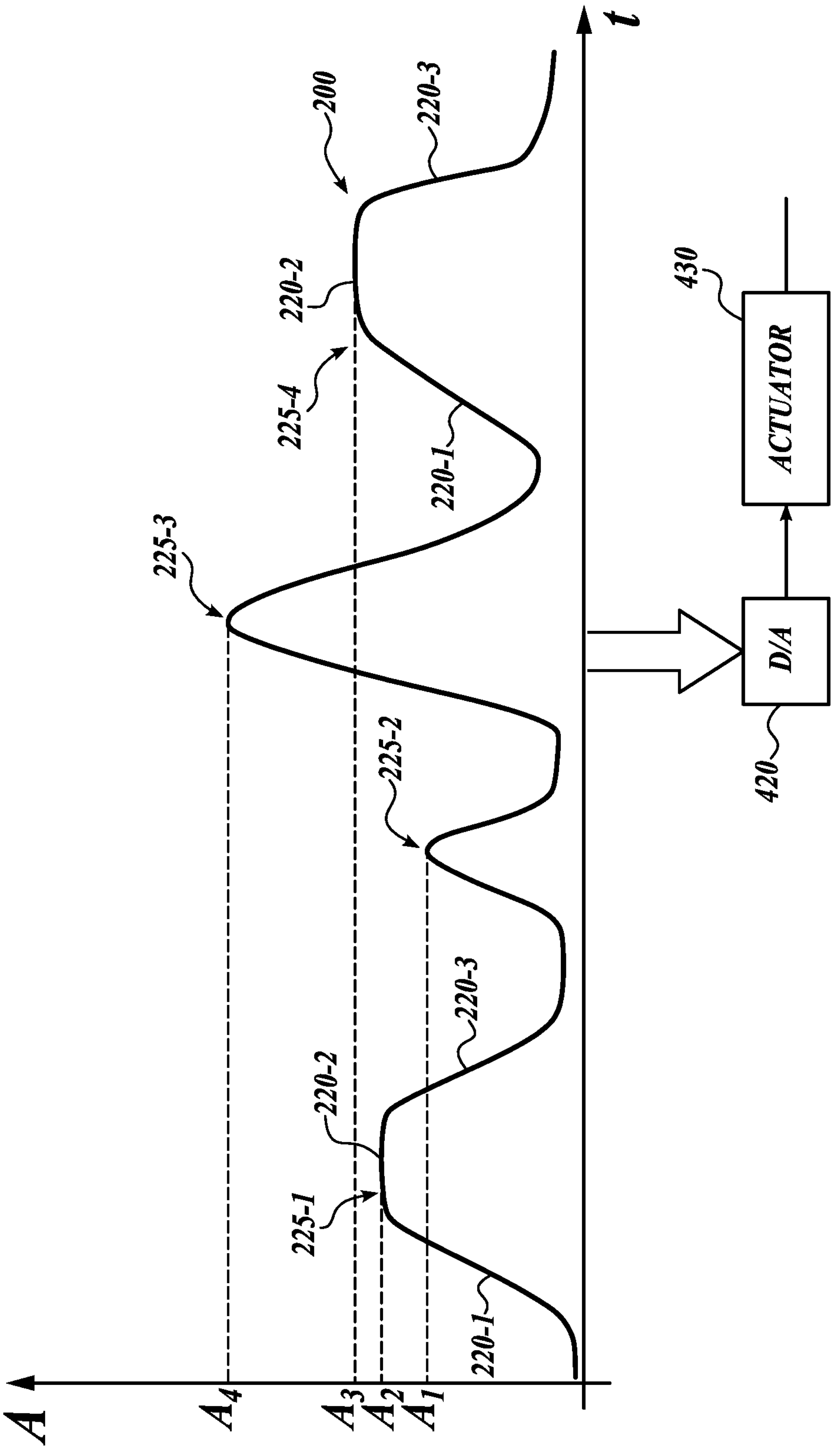
FIGS. 4A and 4B are graphs of actuation inputs in accordance with an embodiment of the present technology.

FIG. 4A is a graph of actuation inputs 225-1 to 225-4 in accordance with an embodiment of the present technology. The horizontal axis of the graph shows the time, and the vertical axis shows the amplitude of the actuation input. A sample sinusoidal actuation input 225-1 includes the sinusoidal rising edge 220-1, a relatively flat steady amplitude 220-2 (A2), and the sinusoidal falling edge 220-3. Sample sinusoidal actuation inputs 225-2 and 225-3 include their respective sinusoidal rising edges and the sinusoidal falling edges, but without appreciable steady amplitudes (amplitude plateau). In some embodiments, the actuator may receive sinusoidal actuation inputs 225-2 and 225-3 having uneven amplitudes (e.g., the amplitudes A1 and A4). In some embodiments, the actuation inputs for the actuator may not necessarily operate at the same frequencies of the rising/falling edges. For example, the actuation inputs 225-1 to 225-3 may operate at the frequencies f1 to f3.

A sample sinusoidal actuation input 225-4 includes the sinusoidal rising edge 220-1, a relatively flat steady amplitude 220-2 (A3), and the sinusoidal falling edge 220-3. In some embodiments, the sinusoidal rising edge 220-1 and the sinusoidal falling edge 220-3 may have different frequencies. With the illustrated sinusoidal actuation input 225-4, the frequency of the sinusoidal rising edge 220-1 has a lower frequency than the sinusoidal falling edge 220-3, but the opposite is also possible.

In some embodiments, the curves that represent sinusoidal actuation inputs may be digitized. These digitized inputs can be transformed into corresponding analog inputs by a digital to analog (D/A) converter 420 connected to an actuator 430. In some embodiments, the output from the D/A converter is used as an input or to regulate the input provided to the actuator 430.

Figure 4B:
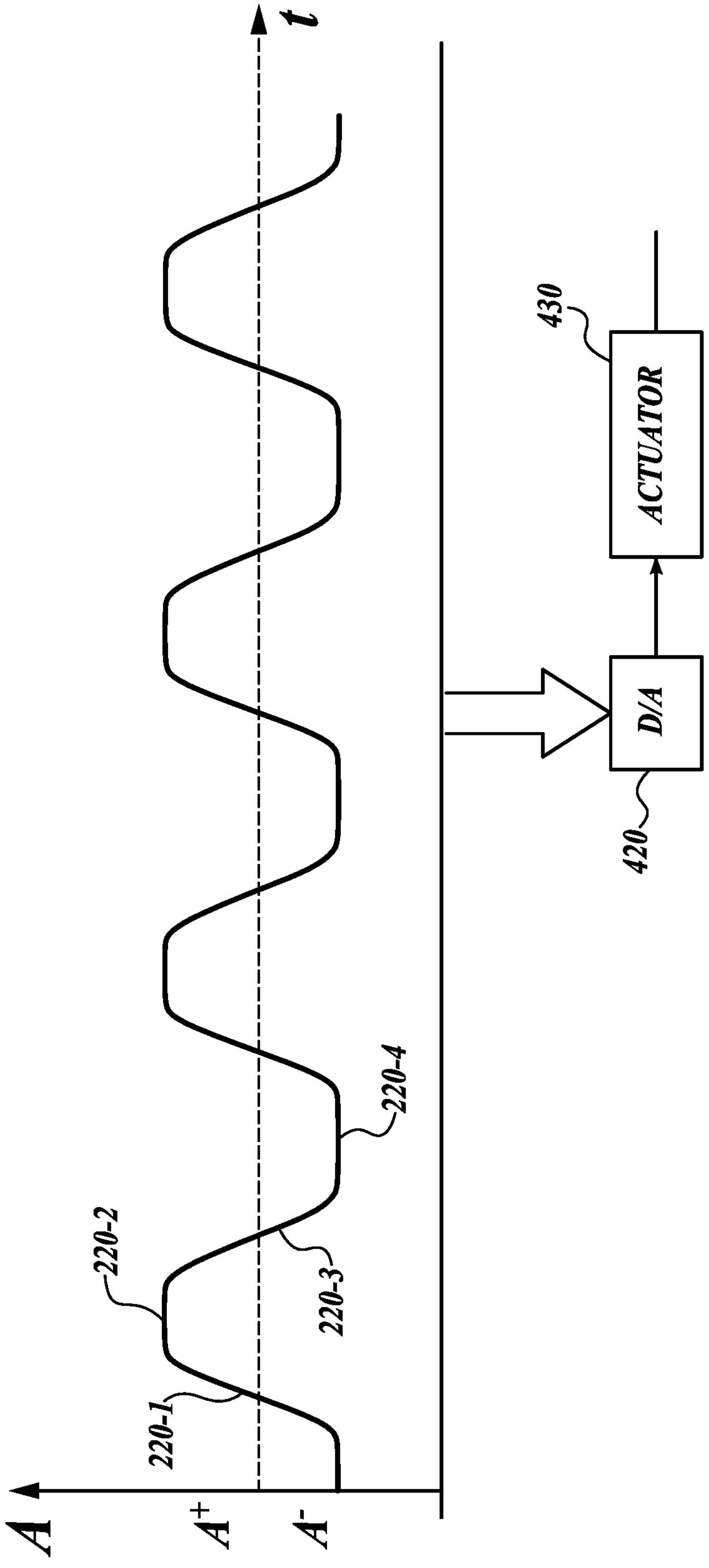

FIG. 4B is a graph of actuation inputs 225-1 to 225-4 in accordance with an embodiment of the present technology. Similarly to the graph in FIG. 4A, the horizontal axis of the graph shows the time, and the vertical axis shows the amplitude of the actuation input. The amplitude of the illustrated sinusoidal actuation ranges from a negative value A− (negative amplitude plateau 220-4) to a positive value A+ (positive amplitude plateau 220-2). Such a sinusoidal amplitude of the actuation input may be referred to as an AC sinusoidal actuation.

Figure 5:
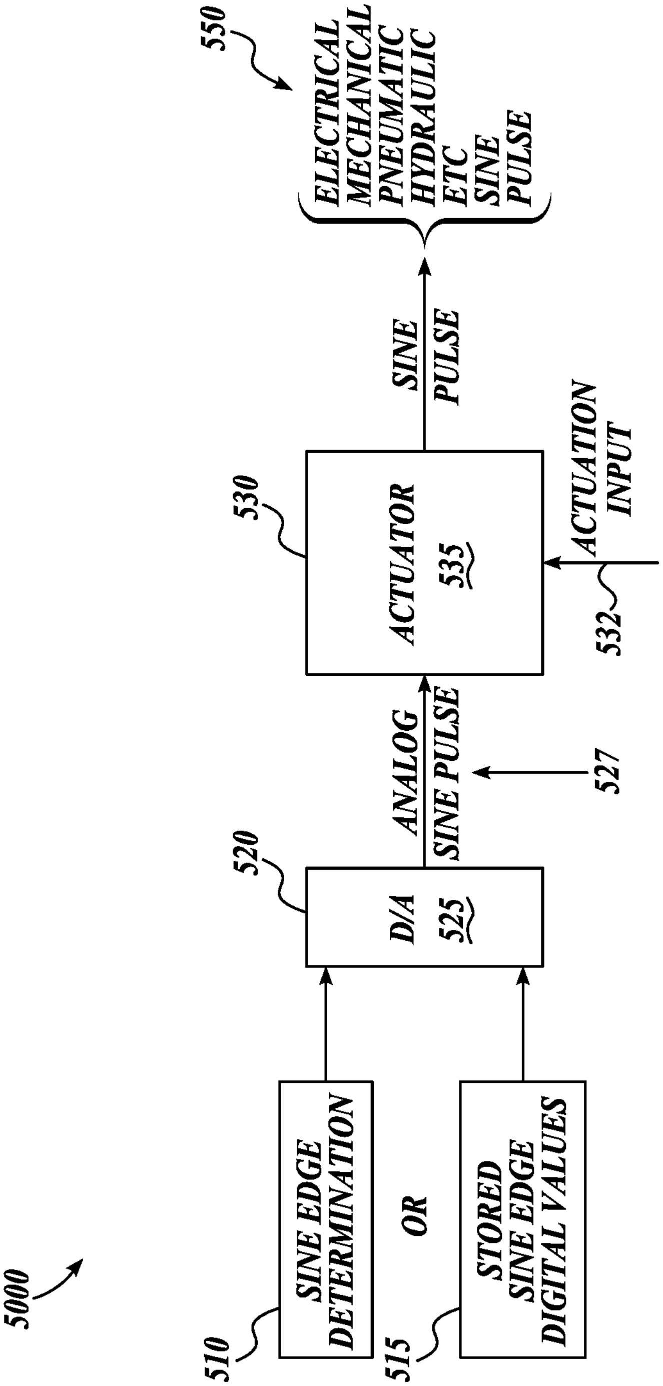
FIG. 5 is a flowchart of a method for sine pulse actuation in accordance with an embodiment of the present technology.

FIG. 5 is a flowchart of a method 5000 for sine pulse actuation in accordance with an embodiment of the present technology. In some embodiments, the sinusoidal rising edge, the sinusoidal falling edge and/or the steady amplitude can be determined from the stored digital values (step 515) or by analytical determination of sine function (step 510). In some embodiments, general purpose computers, digital controllers, analog controllers, or volatile/permanent memory devices can execute steps 510 or 515. In some embodiments, steps 510 and 515 may be combined to determine the sine pulse. In step 520, a D/A converter 525 converts the digital input into an analog output 527.

In many applications, a magnitude of the analog output of the D/A converter 525 is insufficient to properly actuate an actuator 535. Therefore, in step 530, in addition to the analog input from the D/A converter 525, the actuator 535 also receives an actuation input 532 (e.g., electrical voltage/current from an energized bus, pressurized hydraulic fluid, pressurized air, etc.). In some embodiments, the analog sine pulse 527 modulates a generally constant actuation input 532 to generate a sine pulse output 550 having an amplitude suitable for, for example, applying pressure on the brake pads, moving an object from one point to another, generating a jet of spray paint, etc. Some exemplary applications of the inventive technology are described with respect to FIGS. 6 and 7 below.

Figure 6:
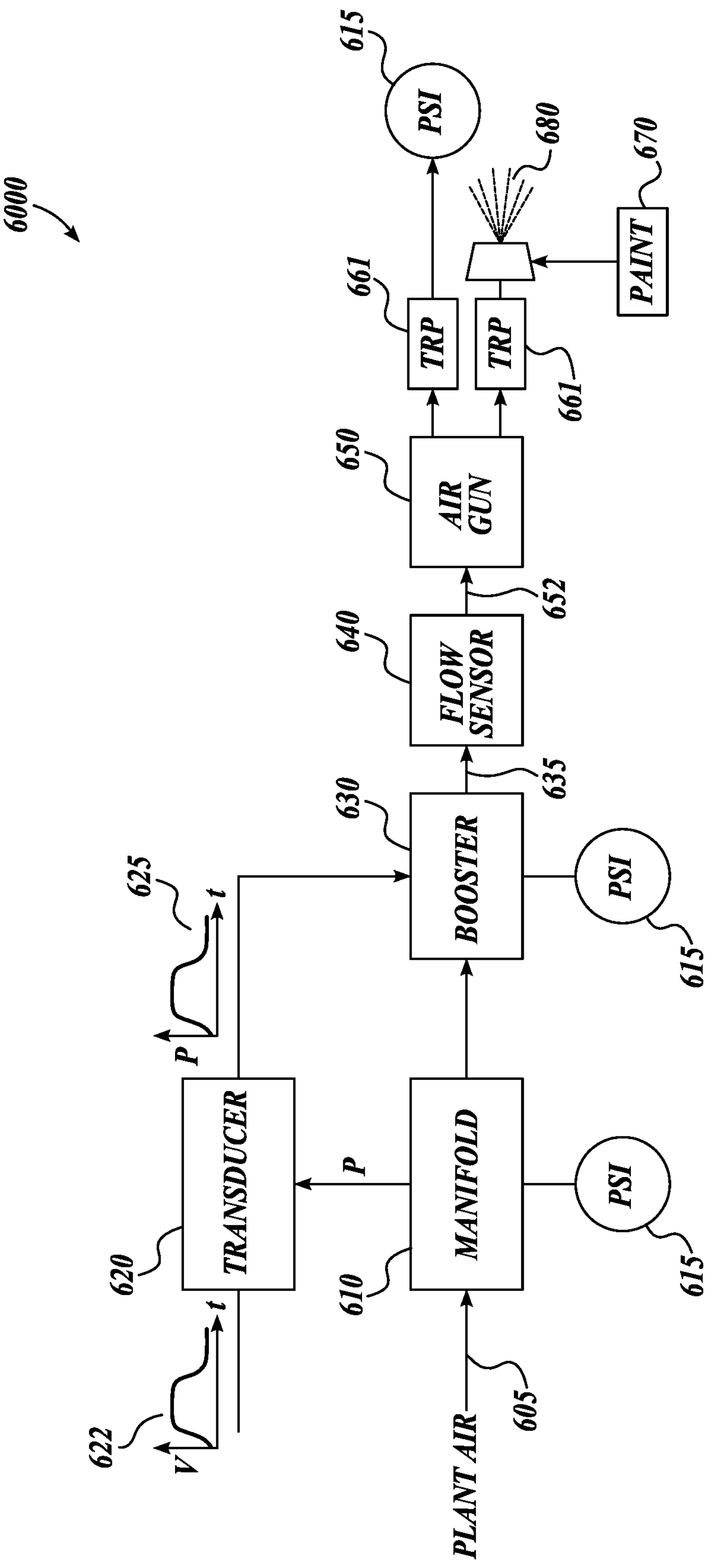
FIG. 6 is a schematic view of an actuation system in accordance with an embodiment of the present technology.

FIG. 6 is a schematic view of an actuation system 6000 in accordance with an embodiment of the present technology. In some embodiments, the actuation system 6000 may be used for spray painting of vehicles.

In some embodiments, a manifold 610 receives plant air 605 at a generally constant pressure p, and distributes plant air 605 to a transducer 620 and a booster 630. In addition to the plant air 605, the transducer 620 may receive a sinusoidal input 622 as, for example, a voltage V (t). In response, the transducer 620 may modulate the pressure of the plant air 605 to produce a pressurized air output 625 that is a sinusoidal function.

The booster 630 may receive the pressurized air from the output 625 of the transducer 620 and also the plant air 605 from the manifold 610. In response, the booster 630 produces a stream of pressurized air 635 having a pressure that behaves as a sine pulse (e.g., a sinusoidal rising edge, a steady amplitude, and a sinusoidal falling edge).

In some embodiments, a flow sensor 640 may meter the flow of the pressurized air coming from the booster 630. In some embodiments, pressure gauges 615 measure pressure of the pressurized air at different points of the actuation system 6000.

In some embodiments, the pressurized air having sinusoidal pressure proceeds to an air gun 650 as an input 652. In some embodiments, the air gun 650 distributes the pressurized air to one or more triggering paint/air mechanisms (TRPs) 661. Some TRPs 661 may be connected to the pressure gauge 615 for, for example, monitoring of the system performance. One or more TRPs 661 may be connected to a source of paint 670 to produce a paint jet 680. In at least some embodiments, the sinusoidal pulses of the air pressure may reduce the consumption of the plant air, result in less frequent failures of the air gun 650, and/or result in more uniform application of the paint jet 680.

Figure 7A:
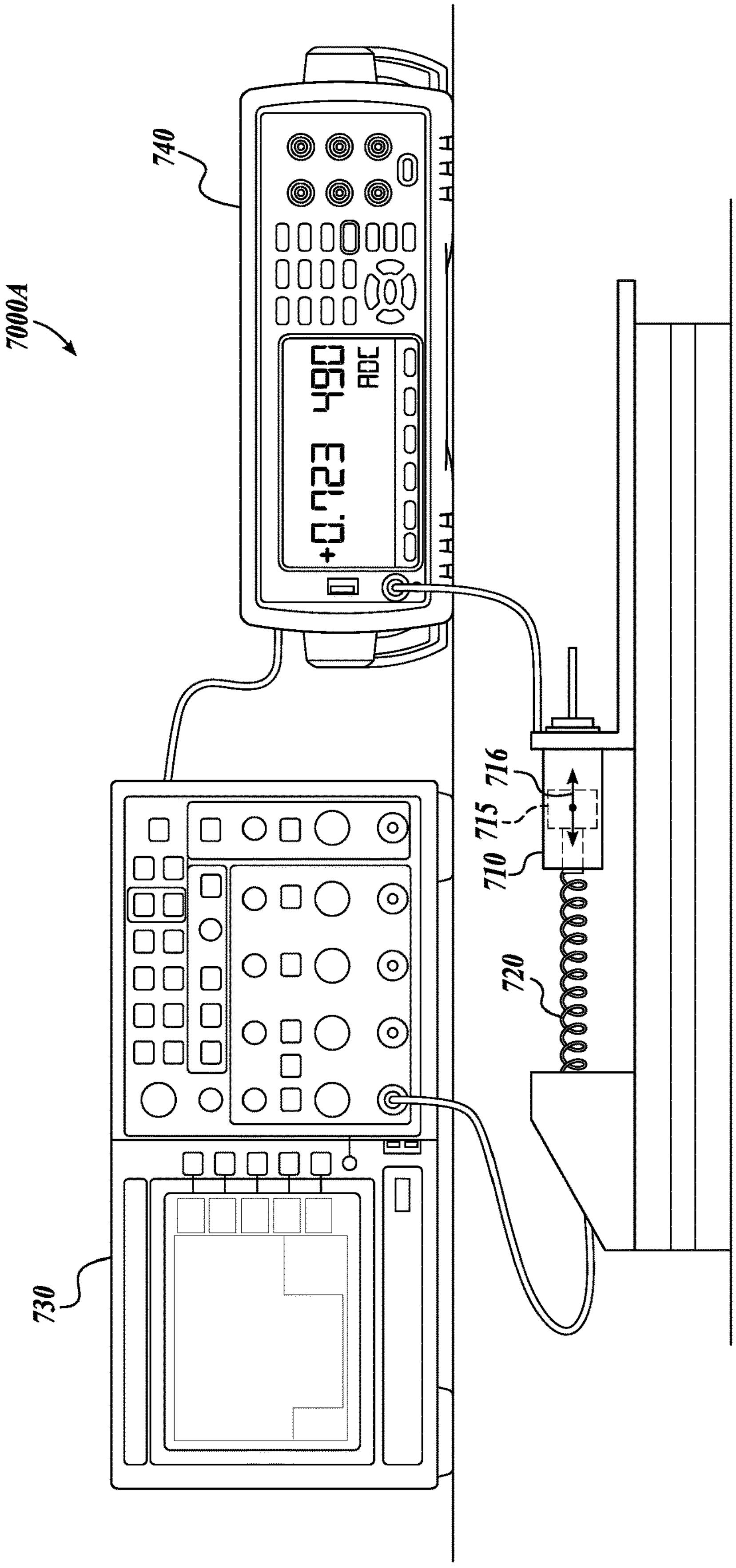
FIGS. 7A and 7B are simplified views of actuation systems in accordance with an embodiment of the present technology.

FIG. 7A is a simplified view of an actuation system 7000A in accordance with an embodiment of the present technology. The actuation system 7000A includes an electrical solenoid 710 attached to a spring 720 that represents a load on the electrical solenoid. In practical applications, the electronic solenoid may be connected to an object that needs to be moved from one point to another, to electrical brakes, to valves, to windshield wipers, or other systems.

The electrical solenoid 710 has an armature 715 that can move in/out of the solenoid (in a direction 716) based on the electrical current received from a power supply 740. The parameters of the electrical solenoid 710, for example, voltage, electrical current, and/or frequency may be tracked on an oscilloscope 730.

Figure 7B:
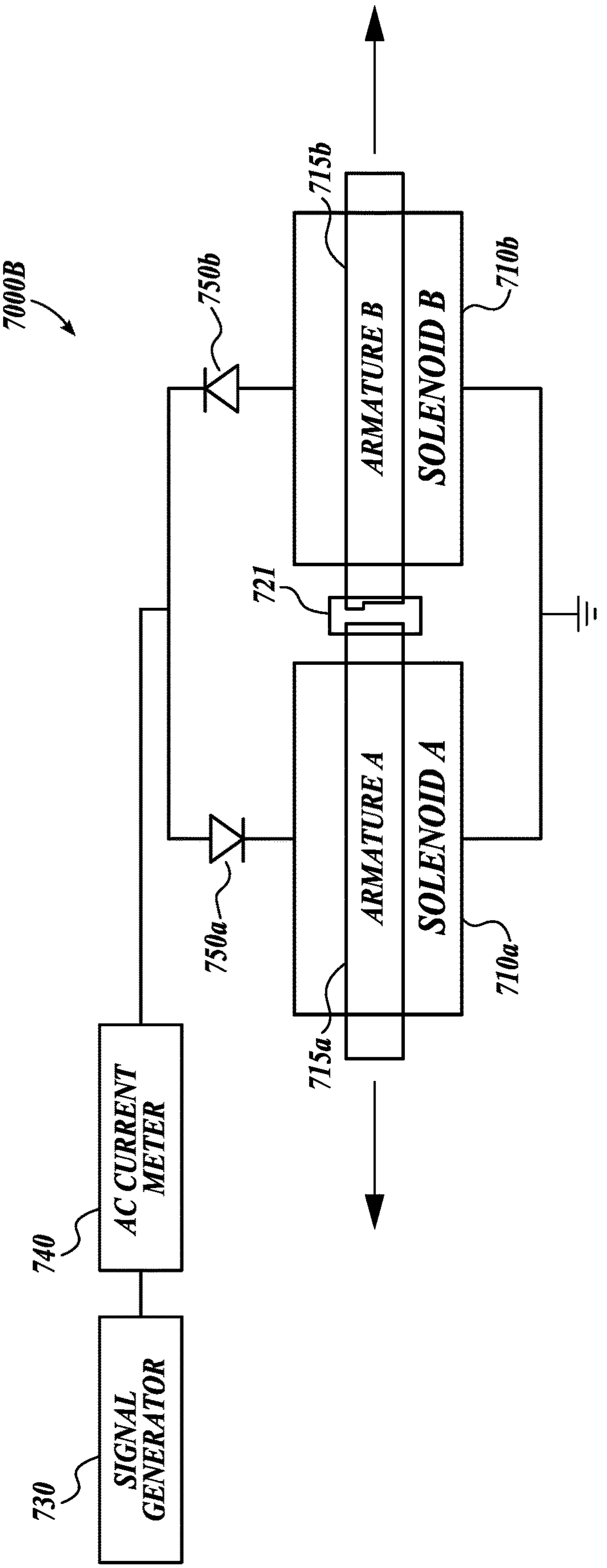

FIG. 7B is a simplified view of an actuation system 7000B in accordance with an embodiment of the present technology. The actuation system 7000B includes two electrical solenoids 710*a* and 710*b* attached to the same load 721. In some embodiments, the signal generator 730 may generate the AC actuation comparable to that described with reference to FIG. 4B. In operation, the positive voltage (e.g., the positive actuation) is passed through a diode 750*a* to the solenoid 710*a*, and the negative voltage is passed through a diode 750*b* to the solenoid 710*b*. As a result, the armatures 715*a* and 715*b* operate for a period of the actuation cycle in a complementary way. Such an arrangement of the solenoids 710*a*/710*b* or other actuators may be termed a linear reciprocating machine or a linear reciprocating engine. Without being bound to theory, it is believed that the illustrated reciprocating actuation may result in a lower audible and/or electrical noise of the actuation system 7000B. In practical applications, electronic solenoids may be connected to an object that needs to be moved from one point to another, to electrical brakes, to valves, to windshield wipers, or other systems. Several examples of the parameters of the electrical solenoid 710 are explained with reference to FIGS. 8A-8C below.

Figure 8A:
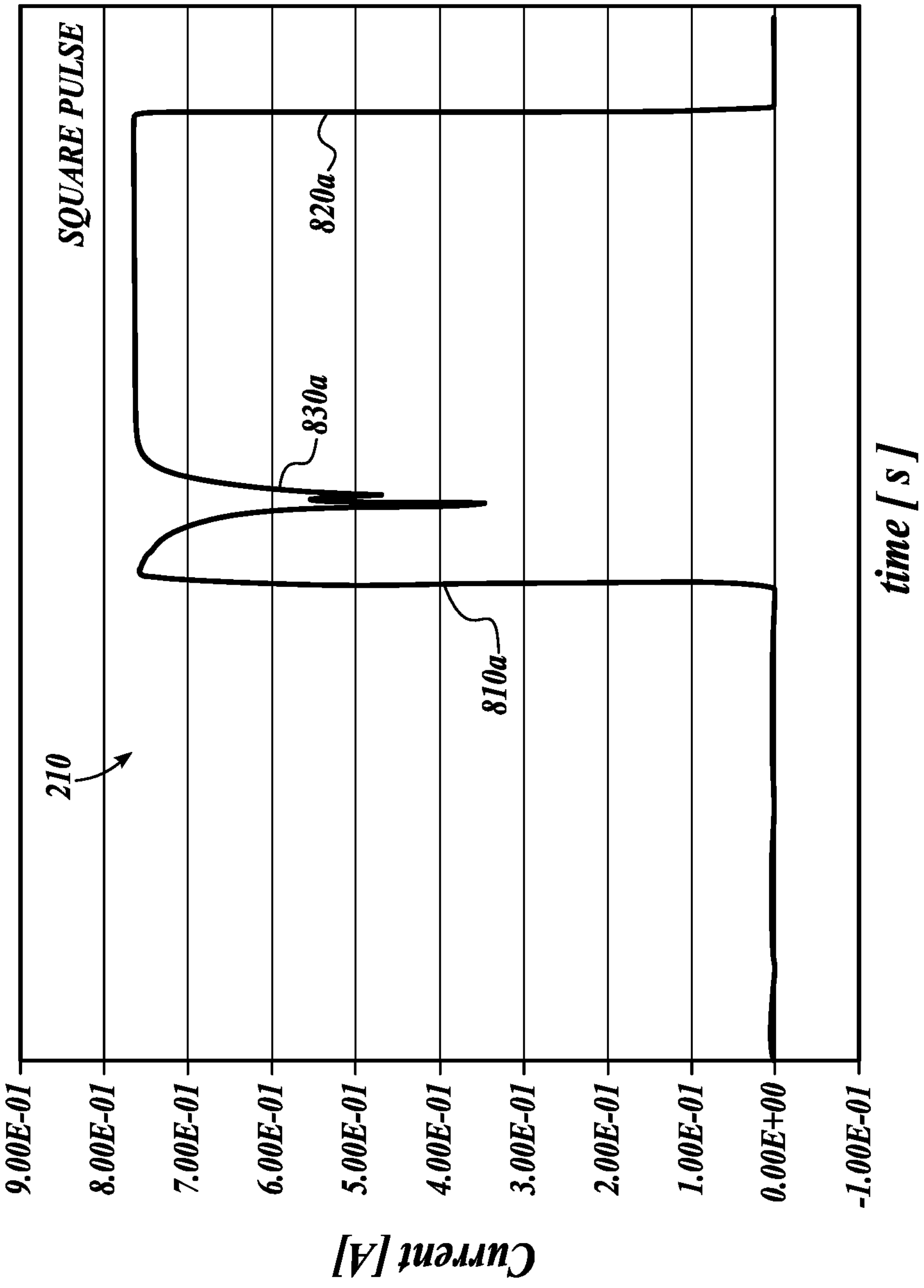
FIG. 8A (PRIOR ART)
FIG. 8A is a graph of an actuation input in accordance with conventional technology.

FIG. 8A is a graph of an actuation input 210 in accordance with conventional technology. The horizontal axis represents time in seconds, and the vertical axis represents electrical current from the power supply in Amperes. The actuation input 210 has a rising edge 810*a* and the falling edge 820*a* of the conventional square wave curve. Accordingly, the actuation input 210 causes the shortcomings of the conventional actuation, for example, low efficiency, increased noise, etc. Additionally, the actuation input 210 has an amplitude dip 830*a* that further reduces actuation efficiency, and increases noise in the system.

Figure 8B:
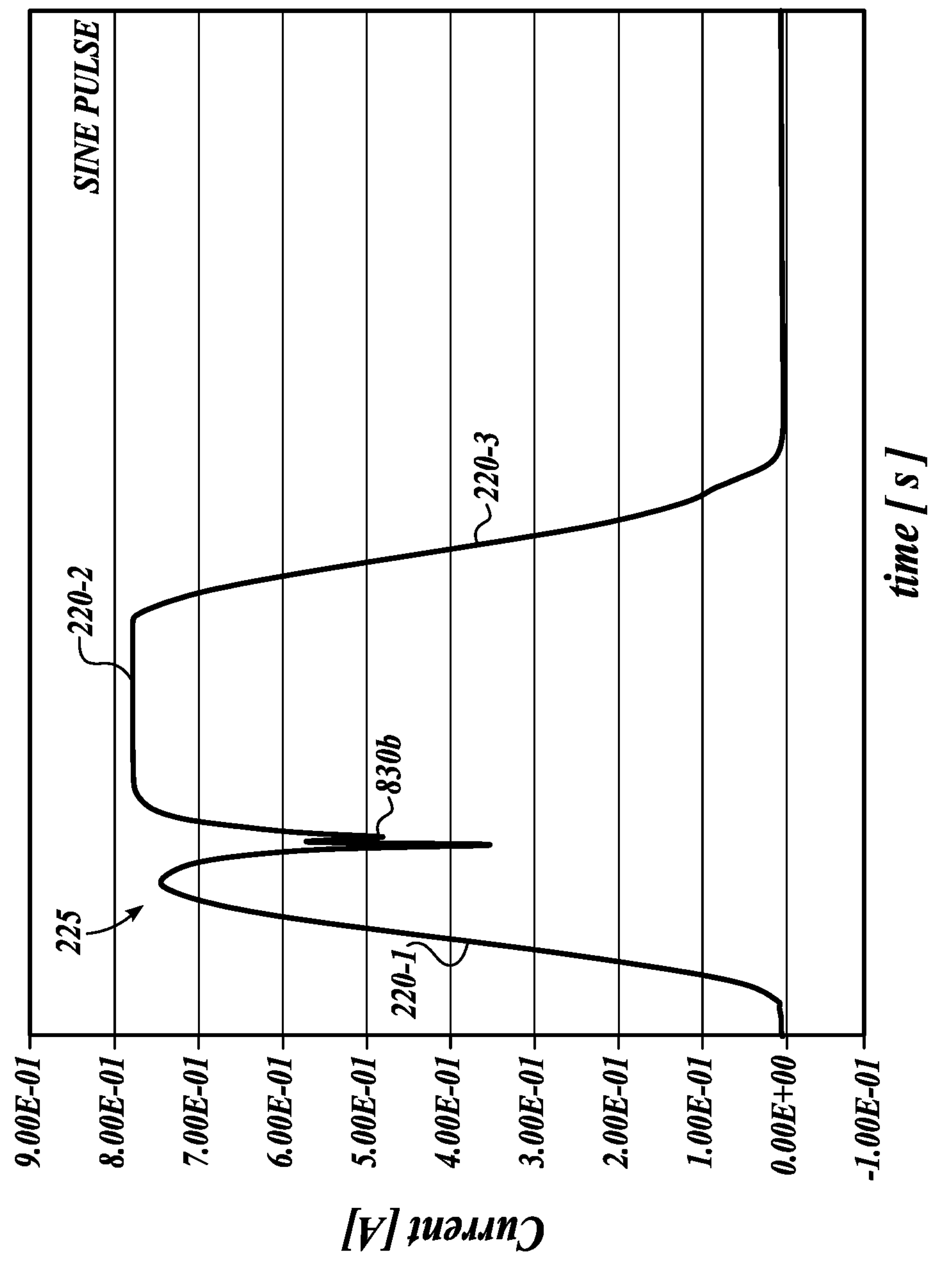
FIGS. 8B and 8C are graphs of actuation input in accordance with an embodiment of the present technology.
Figure 8C:
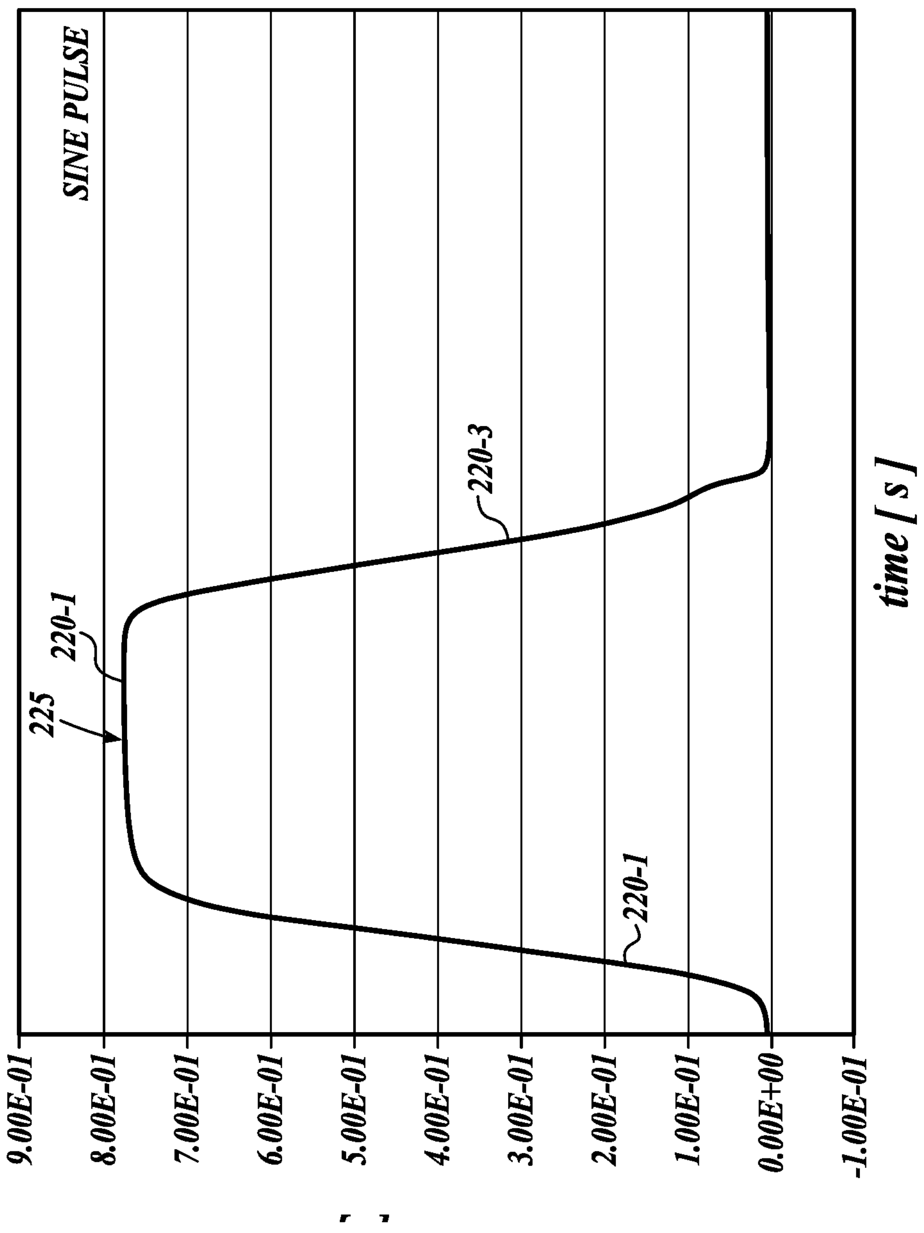

FIGS. 8B and 8C are graphs of actuation inputs 225 in accordance with an embodiment of the present technology. The horizontal axis represents time in seconds, and the vertical axis represents electrical current from the power supply in Amperes in both graphs.

The graph in FIG. 8B corresponds to the sinusoidal actuation input. The actuation input 225 includes the sinusoidal rising edge 220-1 and sinusoidal falling edge 220-3. In some embodiments, the sinusoidal actuation input results in up to 46% lower current draws during the sinusoidal rising edge 220-1 and falling edge 220-3, therefore reducing the overall power consumption of the solenoid. However, the high amplitude 220-2 of the illustrated actuation input 210 also includes an amplitude dip 830*b*. Generally, such an amplitude dip reduces actuation efficiency and increases noise even for the sinusoidal application. Without being bound to theory, it is believed that the amplitude dip 830*b* results from a mismatch between the frequency of the sinusoidal rising/falling edges and the natural frequency of the combination of the spring 720 and the armature 715.

The graph in FIG. 8C corresponds to the sinusoidal actuation input where the frequency of the sinusoidal rising edge 220-1 and falling edge 220-3 corresponds to the natural frequency of the combination of the spring 720 and the armature 715. Without being bound to theory, it is believed that matching the frequency of the sinusoidal rising/falling edges to the natural frequency of the combination of the spring 720 and the armature 715 may eliminate or at least reduce the amplitude dip of the actuation input. As a result, in at least some embodiments, the efficiency of the system may be further increased, and the noise in the system may be further decreased. In some embodiments, the audible noise of the system may also be reduced.

Additionally, some measurements indicate a reduced energy dissipation of the embodiments described in, for example, FIG. 7B. For instance, when the actuation system 7000B is driven by a sinusoidal pulse input having about 7 ms wide sinusoidal raising/falling edges, the energy consumption of the actuation system 7000B was about 7.5% lower than the energy dissipated using the square or trapezoidal wave input (e.g., a trapezoidal pulse having about 1 ms wide raising/falling edges). Many embodiments of the technology described above may take the form of computer-executable or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A method for actuating a first actuator and a second actuator, comprising:

operatively connecting the first actuator and the second actuator to a signal generator, the first actuator and second actuator adapted to operate on a vehicle system;

supplying a first phase of a first input as a first portion of a first drive signal input to the first actuator and supplying a second phase of the first input as a first portion of a second drive signal input to the second actuator, wherein the first input corresponds to a rising edge of a first sine function;

supplying a first phase of a second input as a second portion of the first drive signal input to the first actuator and supplying a second phase of the second input as a second portion of the second drive signal input to the second actuator, wherein the second input corresponds to a generally constant amplitude plateau; and supplying a first phase of a third input as a third portion of the first drive signal input to the first actuator and supplying a second phase of the third input as a third portion of the second drive signal input to the second actuator, wherein the third input corresponds to a falling edge of a second sine function.

2. The method of claim 1, wherein the first and second sine functions are the same.

3. The method of claim 1, wherein the first and second sine functions have different frequencies and the same amplitude.

4. The method of claim 1, further comprising cyclically repeating the first, second, and third inputs.

5. The method of claim 1, further comprising:

supplying a fourth input to the first actuator and the second actuator after the third input to the first actuator and the second actuator, and wherein the fourth input corresponds to a generally constant negative amplitude plateau to generate an AC sinusoidal actuation.

6. The method of claim 1, wherein the first actuator and the second actuator are selected from a group consisting of a pneumatic actuator, a hydraulic actuator, and an electrical solenoid.

7. The method of claim 1, wherein the first, second, and third inputs to the first actuator and the second actuator are provided by energizing an electrical power bus.

8. The method of claim 1, further comprising:

determining a first set of digitized values corresponding to the rising edge of the first sine function;

determining a second set of digitized values corresponding to the falling edge of the second sine function; and converting the first and second sets of digitized values to an analog function using a digital-to-analog (D/A) converter.

9. The method of claim 7, wherein the first, second, and third inputs to the first actuator and the second actuator are voltages.

10. An actuation system, comprising:

a signal generator;

a vehicle system;

a first actuator operatively connected to the signal generator and a first actuator input, the first actuator adapted to operate on the vehicle system;

a second actuator operatively connected to the signal generator and a second actuator input, the second actuator adapted to operate on the vehicle system; and wherein the signal generator is configured to:

supply a first input, wherein the first input corresponds to a rising edge of a first sine function;

supply a second input, wherein the second input corresponds to a generally constant amplitude plateau; and supplying a third input, wherein the third input corresponds to a falling edge of a second sine function;

wherein a first phase of the first input, second input, and third input are provided as a first drive signal input to the first actuator and a second phase of the first input, second input, and third input are provided as a second drive signal input to the second actuator.

11. The actuation system of claim 10, wherein the vehicle system comprises at least one of a fuel injection system, a braking system, a diesel exhaust fluid dosing system, a windshield wiper system, and a vehicle electronics system.

12. The actuation system of claim 10, wherein the signal generator comprises:

a controller configured to determine a first set of digitized values corresponding to the rising edge of the first sine function, and a second set of digitized values corresponding to the falling edge of the second sine function; and a digital-to-analog (D/A) converter.

13. The actuation system of claim 10, wherein the first actuator and the second actuator are selected from a group consisting of a pneumatic actuator, a hydraulic actuator, and an electrical solenoid.

14. The actuation system of claim 10, wherein at least one of the first actuator and the second actuator is an electrical solenoid having an armature, and wherein a natural frequency of the armature corresponds to a frequency of the first and second sine functions.

15. The actuation system of claim 10, wherein the signal generator includes an electrical power bus.

16. The actuation system of claim 10, wherein the signal generator is further configured to supply a fourth input, wherein the fourth input corresponds to a generally constant negative amplitude plateau to generate an AC sinusoidal actuation.

17. The actuation system of claim 10, wherein the first and second sine functions have different frequencies and the same amplitude.

18. The actuation system of claim 10, wherein the second actuator is configured to work in concert with the first actuator.

19. The actuation system of claim 18, wherein the first actuator and the second actuator are solenoids having their respective armatures, and wherein the armatures oscillate along the same axis.

* * * * *